US008189279B2

(12) United States Patent
Chen

(10) Patent No.: US 8,189,279 B2
(45) Date of Patent: May 29, 2012

(54) TWO-DIMENSIONAL ADJUSTING STRUCTURE AND PROJECTION APPARATUS COMPRISING THE SAME

(75) Inventor: Ching-Ling Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 169 days.

(21) Appl. No.: 12/701,162

(22) Filed: Feb. 5, 2010

(65) Prior Publication Data

US 2010/0202067 A1 Aug. 12, 2010

(30) Foreign Application Priority Data

Feb. 12, 2009 (TW) .............................. 98104445 A

(51) Int. Cl.
*G02B 7/02* (2006.01)

(52) U.S. Cl. ...................................... 359/822; 359/823

(58) Field of Classification Search .......... 359/694–704, 359/811–824
See application file for complete search history.

(56) References Cited

U.S. PATENT DOCUMENTS 4,669,823 A * 6/1987 Iguma et al. .................. 359/824
8,009,355 B2 * 8/2011 Nakai ....................... 359/485.05

FOREIGN PATENT DOCUMENTS

CN 2114804 U 9/1992
CN 2776622 Y 5/2006

* cited by examiner

*Primary Examiner* — Mohammed Hasan
(74) *Attorney, Agent, or Firm* — Patterson Thuente Christensen Pedersen, P.A.

(57) ABSTRACT

A two-dimensional adjusting structure and a projection apparatus comprising the two-dimensional adjusting structure are provided. The two-dimensional adjusting structure comprises a first base, a second base, and a first slide rod and a second slide rod which extend along a first axis and a second axis respectively. The first slide rod is fixed to the first base. The second slide rod is adapted to move along the first axis with respect to the first slide rod by fitting the first slide rod into a first slide hole of the second slide rod. The second base is adapted to move along the second axis with respect to the second slide rod by receiving the second slide rod within a second slide hole. Thereby, the second base is adapted to move with respect to the first base upon a plane along the first axis and the second axis to adjust the relative position of a second object and a first object disposed on the first base and the second base respectively.

17 Claims, 7 Drawing Sheets

TWO-DIMENSIONAL ADJUSTING STRUCTURE AND PROJECTION APPARATUS COMPRISING THE SAME

This application claims the benefits of the priority based on Taiwan Patent Application No. 098104445 filed on Feb. 12, 2009, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a two-dimensional adjusting structure, in particular, to a two-dimensional adjusting structure for a projection apparatus.

2. Descriptions of the Related Art

As digital data becomes increasingly popular, the use of projection apparatuses for presenting digital data also increases accordingly in many conditions and places. Generally, the position of projection image has to be adjusted before using a projection apparatus so that the projection image can be displayed on a projection screen entirely and clearly.

Conventionally, for a non-fixed projection apparatus, the adjustment in position of the projection image requires manual adjustment in the horizontal position of the image. Meanwhile, by operatively associating with a support rack attached to the projection apparatus, the vertical height of the image is adjusted. Moreover, in case the support rack has an insufficient length, the projection apparatus would need to also be raised to match the height of the projection screen and project the image. Such a complex adjustment process becomes inconvenient when using the projection apparatus, and inappropriate adjustments often leads to deflected projected images. On the other hand, for a fixed projection apparatus, the adjustment in position of the projection image has to be done in advance when the projection apparatus is installed so that the projection image matches with the screen. In the latter case, when the projection apparatus is to be used in a given space, the relative position of the projection apparatus and the screen must be pre-considered. Once the projection apparatus is installed, it will be very difficult to adjust the projection image, which causes additional limitation when using the projection apparatus.

To overcome the inconveniences in adjustment of the projection apparatuses described above, a conventional method for adjusting the position of a projection image has been proposed. As shown in FIG. 1, a lens 10 is mounted to a two-dimensional adjusting structure 1 disposed in a projection apparatus. The two-dimensional adjusting structure 1 comprises four bases 11a, 11b, 13a and 13b. The base 13a is adapted to move along a first axis X with respect to the base 13b, the base 11a is adapted to move along a second axis Y with respect to the base 11b, and the base 11a is further connected with the base 13b. In this way, the lens 10 can be adjusted in position. The principle of this adjustment method is to use a combination of two independent one-dimensional adjusting platform assemblies that result in the relative movement along two axes X, Y respectively. Consequently, the adjusting structure has a bulky volume and a heavy weight, and the material cost thereof also increases with the complexity of the elements. Such a bulky adjusting structure can only be used in large projection apparatuses. For typical portable projection apparatuses with a small volume and a limited internal space, it is inappropriate to install such an adjusting structure, which degrades the applicability of the adjusting structure.

Accordingly, efforts still have to be made in the art to provide a two-dimensional adjusting structure which has a small volume and a light weight. Thereby, the two-dimensional adjusting structure can be applied more widely to various projection apparatuses to perform two-dimensional position adjustments in the lenses of the projection apparatuses relative to the screen in a simple way, thereby presenting a complete and clear projection image at the correct position on the screen.

SUMMARY OF THE INVENTION

An objective of this invention is to provide a two-dimensional adjusting structure and a projection apparatus. By using the two-dimensional adjusting structure, the two-dimensional relative movement of a first object disposed on a second base of the projection apparatus with respect to a first base can be accomplished by using a single platform assembly.

The two-dimensional adjusting structure comprises a first base, a second base, a first sliding rod and a second sliding rod. The first sliding rod extends along a first axis and is fixed to the first base. The second sliding rod extends along a second axis and comprises a first sliding hole. The second sliding rod mates with the first sliding rod by using the first sliding hole, so that the second sliding rod is adapted to move along the first axis with respect to the first sliding rod. The second base comprises a second sliding hole for receiving the second sliding rod, so that the second base is adapted to move along the second axis with respect to the second sliding rod. With the above arrangement, the second base is adapted to, by means of the second sliding rod, move along the first axis and the second axis independently with respect to the first base upon a plane.

In the two-dimensional adjusting structure of this invention, the first base is adapted to be fixedly disposed in a body of the projection apparatus, while the second base comprises a lens mount adapted to fix a lens module. Thereby, the lens module is adapted to perform a two-dimensional relative movement along the first axis and the second axis independently with respect to the body.

The two-dimensional adjusting structure of this invention overcomes the limitation of the prior art in which the two independent one-dimensional adjusting platform assemblies must be used in order to achieve a two-dimensional movement function. As a result, the adjusting structure occupies a small space with its small volume. The two-dimensional adjusting structure of this invention is applicable to a variety of projection apparatuses, making it more convenient to operate. Even small portable projection apparatuses will also have sufficient space to accommodate the two-dimensional adjusting structure of this invention.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2A:
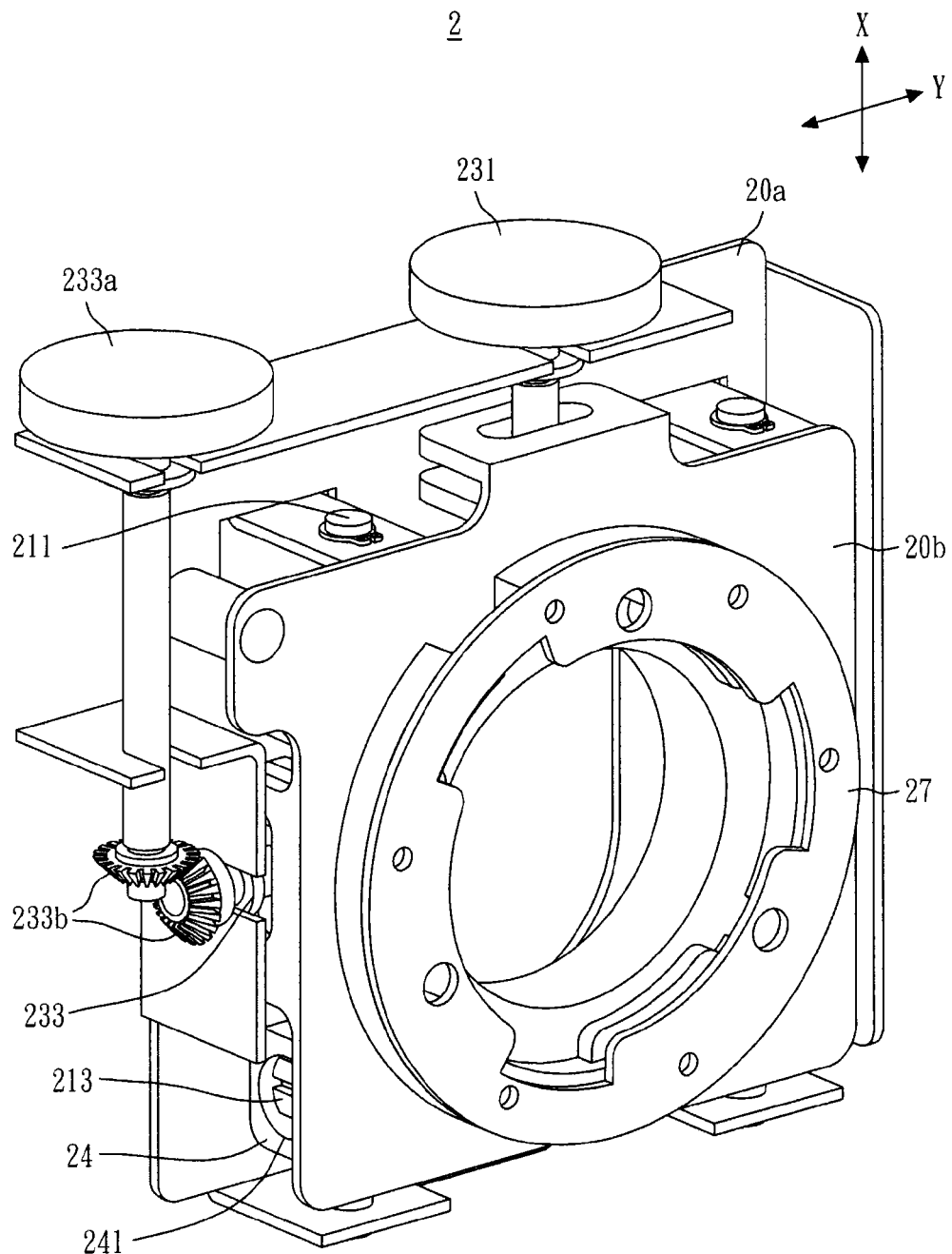
FIG. 2A is a perspective view of the two-dimensional adjusting structure of this invention.
Figure 2B:
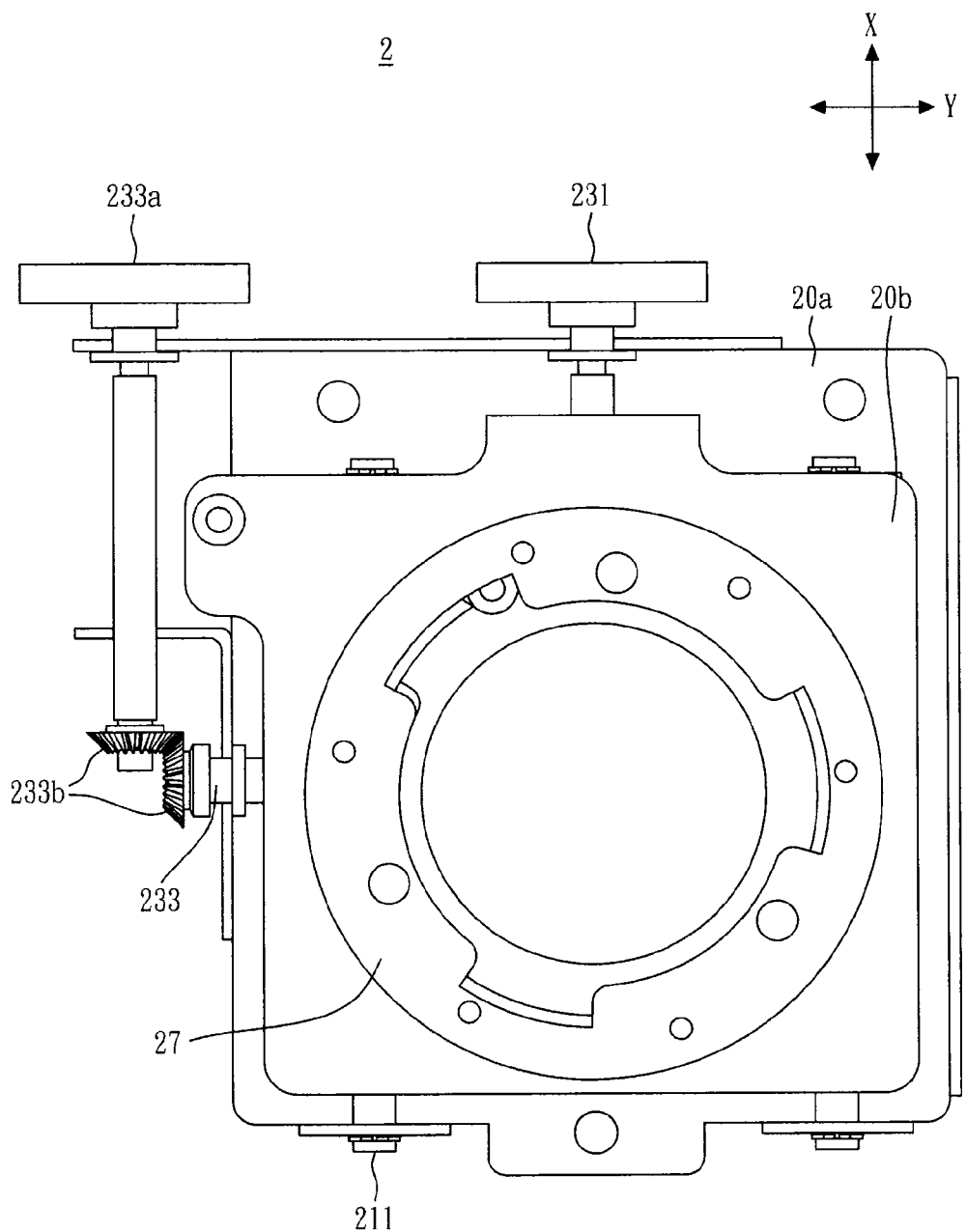
FIG. 2B is a front view of the two-dimensional adjusting structure of this invention.
Figure 2C:
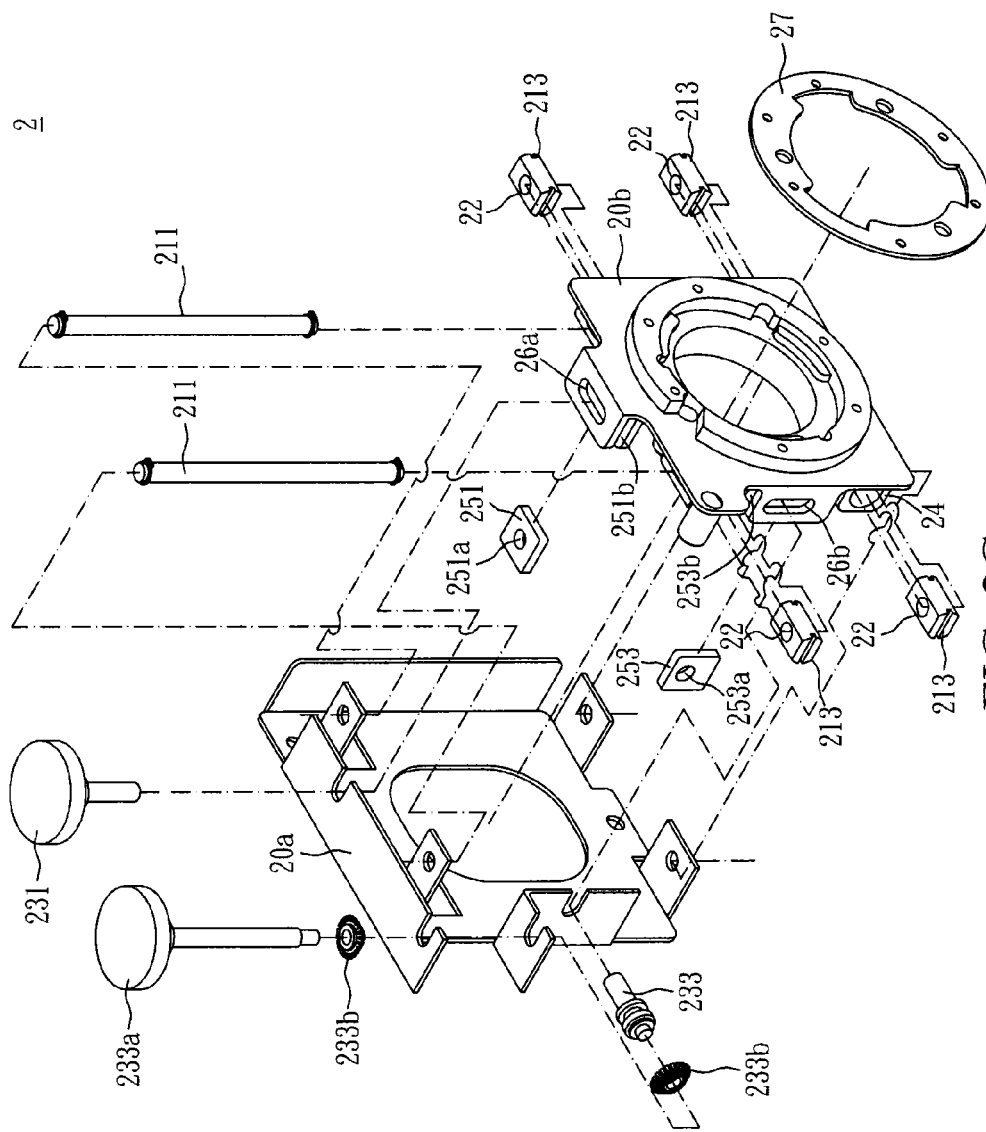
FIG. 2C is an exploded view of the two-dimensional adjusting structure of this invention.

As shown in FIGS. 2A through 2C, the two-dimensional adjusting structure 2 of this invention comprises a first base 20a, at least one first sliding rod 211, at least one second sliding rod 213, a second base 20b and at least one constraining component 24. Through the cooperation of these elements, the second base 20b is adapted to perform a two-dimensional movement upon a plane (not shown) with respect to the first base 20a, thereby adjusting the position of a first object (e.g., a lens module) fixed on the second base 20b with respect to a second object (e.g., a projection apparatus) fixed on the first base 20a. For purposes of illustration, the detailed description will be made hereinafter with reference to a preferred embodiment of this invention.

As shown in FIG. 2C, the two-dimensional adjusting structure 2 of this embodiment comprises two first sliding rods 211, four second sliding rods 213 and four constraining components 24. The four constraining components 24 are formed at the four corners of the second base 20b respectively, the second sliding rods 213 are received in the four constraining components 24 respectively, and each of the first sliding rods 211 are inserted through two second sliding rods 213 and two constraining components 24 respectively. With the above arrangement, the relative position of the second object (e.g., a body of the projection apparatus), which is fixedly connected with the first base 20a, with respect to the first object (e.g., a lens module), which is fixedly disposed on the second base 20b, can be adjusted. It should be noted that the amount and shapes of the first sliding rods 211, the second sliding rods 213, the constraining components 24 and other corresponding structures of this invention are not limited to what is disclosed in this embodiment and the attached drawings, and other alterations within the spirit of this invention will be readily known by those of ordinary skill in the art upon reviewing the descriptions of this embodiment and corresponding drawings.

For ease of description, a further description will be made hereinafter on only one set of the first sliding rods 211, the second sliding rods 213 and the constraining components 24. As shown in FIGS. 2A through 2C, the first sliding rod 211 extends along the first axis X and is fixed to the first base 20a. The second sliding rod 213 extends along the second axis Y, which is substantially perpendicular to the first axis X. The second sliding rod 213 comprises a first sliding hole 22, by means of which the second sliding rod 213 mates with the first sliding rod 211 so that the second sliding rod 213 is adapted to move along the first axis X with respect to the first sliding rod 211.

Figure 2D:
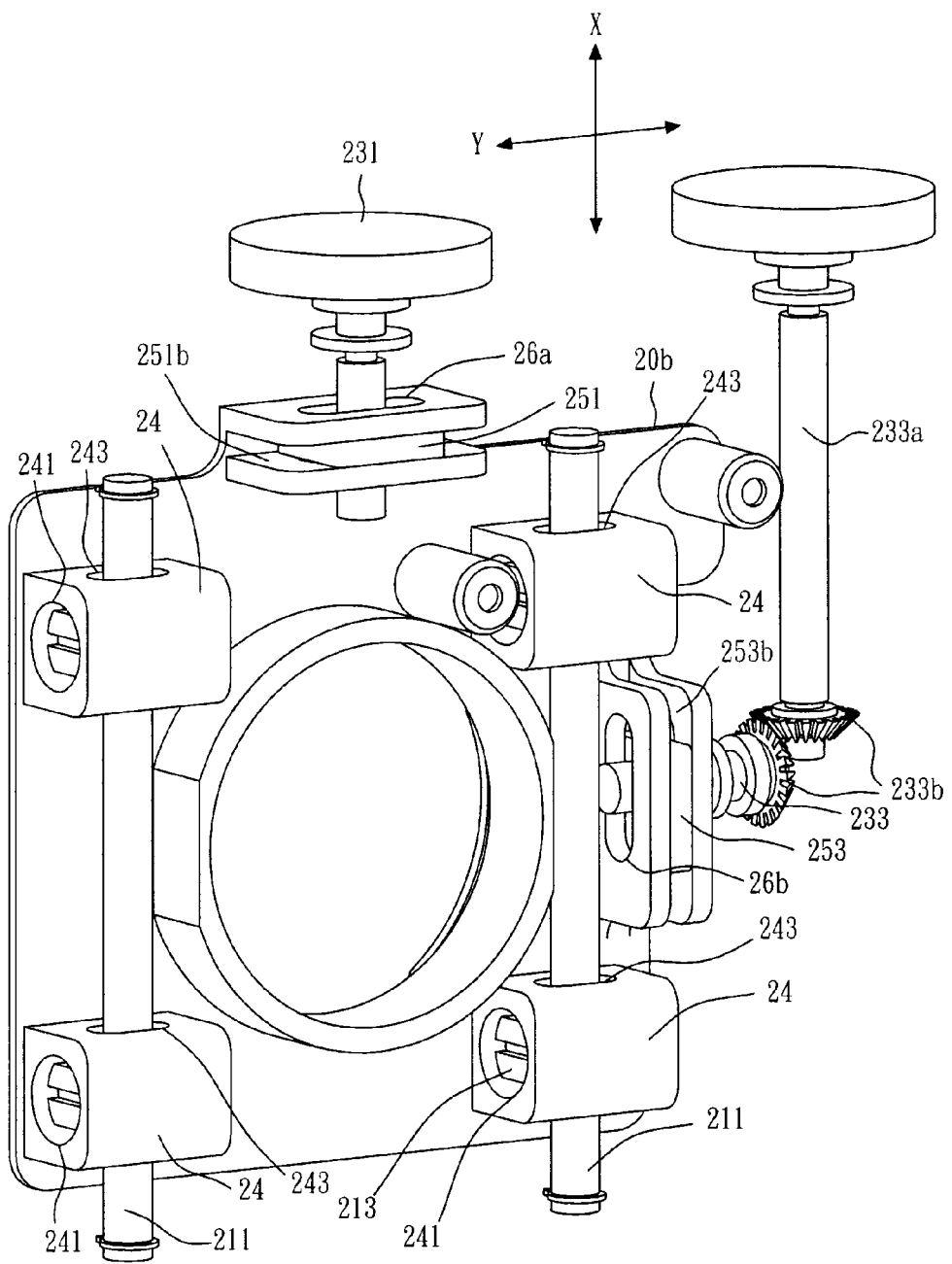
FIG. 2D is a perspective view of partial elements of the two-dimensional adjusting structure of this invention.
Figure 2E:
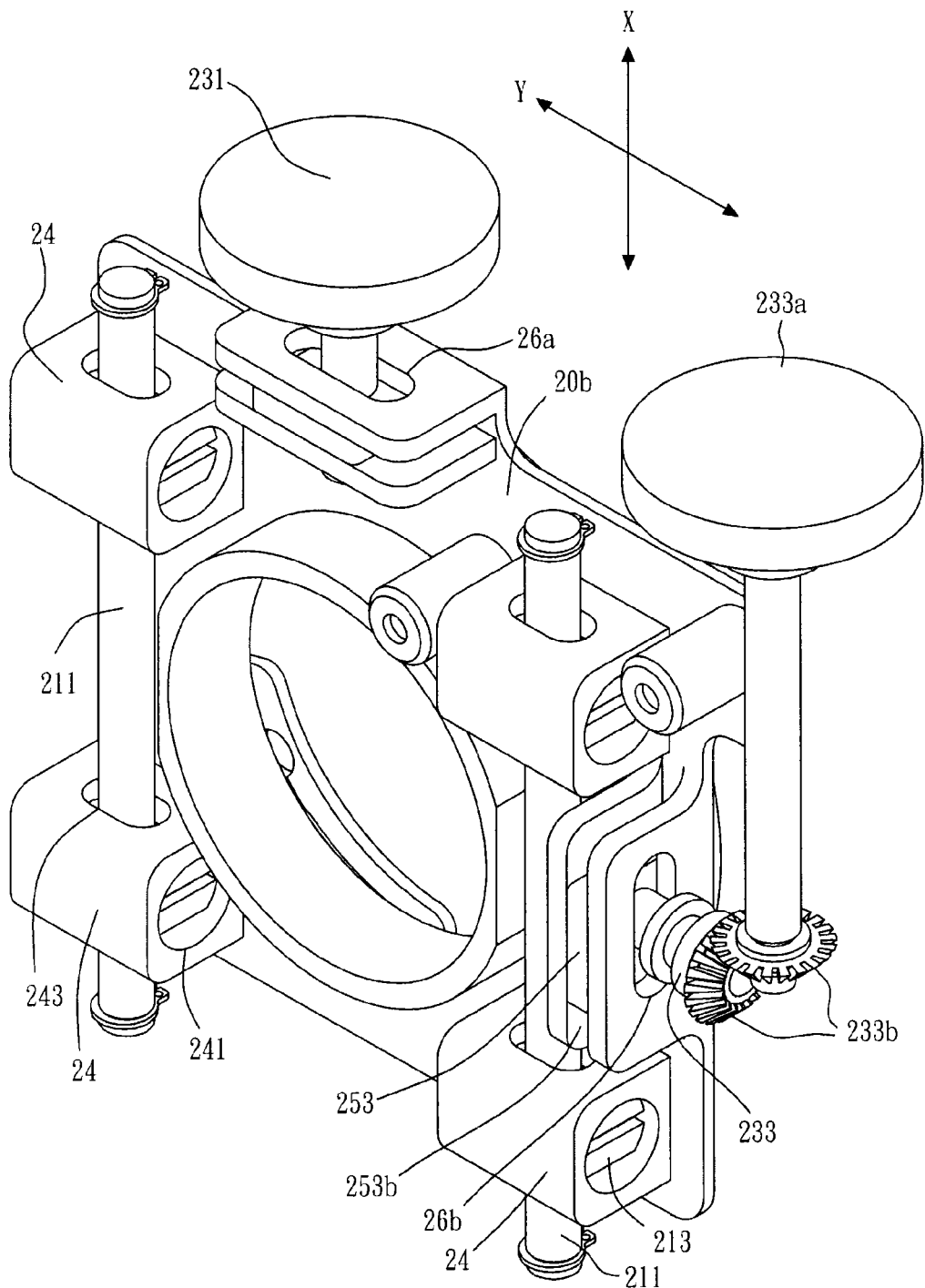
FIG. 2E is another perspective view of partial elements of the two-dimensional adjusting structure of this invention.

In reference to both FIGS. 2D and 2E (for ease of description, the first base 20a is not shown in these two drawings), the constraining component 24 is fixedly disposed on the second base 20b. In this embodiment, the constraining component 24 is substantially formed integrally with the second base 20b. Each of the constraining components 24 is adapted to receive one first sliding rod 211 and one second sliding rod 213, and is formed with a predetermined space to allow the first sliding rod 211 to partially move along the second axis Y with respect to the constraining component 24. More specifically, the predetermined space of each of the constraining components 24 comprises a second sliding hole 241, which is adapted to receive the second sliding rod 213 and allow the second sliding rod 213 to move along the second axis Y therein; i.e., the second base 20b is adapted to move along the second axis Y with respect to the second sliding rod 213.

The predetermined space further comprises a first slot 243 extending along the second axis Y and in communication with the second sliding hole 241. The first slot 243 is formed to penetrate through the constraining component 24 for the first sliding rod 211 to be inserted therethrough and for receiving the first sliding rod 211, so that the first sliding rod 211 can partially move along the second axis Y with respect to the constraining component 24. It should be noted that details of the first slot 243 formed in the constraining component 24 are not limited to what is disclosed in this embodiment and the attached drawings; rather, any means that can receive the first sliding rod 211 and allow the constraining component 24 to partially move along the second axis Y with respect to the first sliding rod 211 will fall within the scope of this invention. In this way, while the second base 20b moves along the second axis Y with respect to the second sliding rod 213, the first slot 243 is adapted to partially move along the second axis Y with respect to the first sliding rod 211, thereby preventing the first sliding rod 211 from interfering with the movement of the second base 20b along the second axis Y with respect to the first base 20a.

The two first sliding rods 211 are fixed to the first base 20a with an interval and each of the first sliding rods 211 are inserted through the first slots 243 of the two corresponding constraining components 24 respectively. Two of the four second sliding rods 213 mate with one corresponding first sliding rods 211 by means of the first sliding holes 22 thereof, and the four second sliding rods 213 are received in the four second sliding holes 241 of the four constraining components 24 respectively. With the configuration and arrangement of the second sliding rods 213 described above, the second base 20b is adapted to move along the first axis X and the second axis Y respectively with respect to the first base 20a upon a plane.

In reference to FIGS. 2C through 2E, for ease of adjustment in practical applications, the two-dimensional adjusting structure 2 further comprises a first screw 231 and a second screw 233 disposed on the first base 20a. The first screw 231 is disposed along the first axis X, while the second screw 233 is disposed along the second axis Y. When the first screw 231 rotates along the first axis X, the first screw 231 is adapted to engage with a first threaded hole 251a formed in a first sliding block 251 to drive the second base 20b to move along the first axis X. When the second screw 233 rotates along the second axis Y, the second screw 233 is adapted to engage with a second threaded hole 253a formed in a second sliding block 253 to drive the second base 20b to move along the second axis Y.

In references to both FIGS. 2C and 2D, in this embodiment, the second base 20b comprises a first sliding block 251 and a first sliding groove 251b extending along the second axis Y, in which the first sliding block 251 has a first threaded hole 251a. The first sliding groove 251b is adapted to receive the first sliding block 251 so that the first sliding block 251 can slide along the second axis Y and be restricted within the first sliding groove 251b. The second base 20b further comprises a second slot 26a extending along the second axis Y and in communication with the first sliding groove 251b. The second slot 26a is adapted to receive the first screw 231 so that the first screw 231 is inserted therethrough to engage with the first threaded hole 251a. When the first screw 231 rotates along the first axis X with respect to the first sliding block 251, the first sliding block 251 is adapted to lead the second base 20b to move along the first axis X. On the other hand, when the second base 20b moves along the second axis Y, both the first sliding groove 251b is adapted to move along the second axis Y with respect to the first sliding block 251 and the second slot 26a is adapted to move along the second axis Y with respect to the first screw 231, thereby preventing the first screw 231 from interfering with the movement of the second base 20b along the second axis Y with respect to the first base 20a.

Similarly, in reference to both FIGS. 2C and 2E, the second base 20b further comprises a second sliding block 253 and a second sliding groove 253b extending along the first axis X, in which the second sliding block 253 has a second threaded hole 253a. The second sliding groove 253b is adapted to receive the second sliding block 253 so that the second sliding block 253 can slide along the first axis X and be restricted within the second sliding groove 253b. The second base 20b further comprises a third slot 26b extending along the first axis X and in communication with the second sliding groove 253b. The third slot 26b is adapted to receive the second screw 233 so that the second screw 233 is inserted therethrough to engage with the second threaded hole 253a. When the second screw 233 rotates along the second axis Y, the second sliding block 253 is adapted to lead the second base 20b to move along the second axis Y. Furthermore, when the second base 20b moves along the first axis X, both the second sliding groove 253b is adapted to move along the first axis X with respect to the second sliding block 253 and the third slot 26b is adapted to move along the first axis X with respect to the second screw 233, thereby preventing the second screw 233 from interfering with movement of the second base 20b along the first axis X with respect to the first base 20a.

In the above embodiment, to facilitate the user in performing the two-dimensional position adjustment on the same side, the two-dimensional adjusting structure 2 further comprises a bevel gear module and an auxiliary shaft 233a extending along the first axis X. The bevel gear module is disposed between the auxiliary shaft 233a and the second screw 233, and comprises two bevel gears 233b fixedly disposed on the second screw 233 and the auxiliary shaft 233a respectively. The two bevel gears 233b are disposed along the first axis X and the second axis Y respectively and are engaged with each other. While the auxiliary shaft 233a rotates along the first axis X, the two bevel gears 233b are adapted to translate the rotation of the auxiliary shaft 233a along the first axis X into the rotation of the second screw 233 along the second axis Y to drive the second base 20b to move along the second axis Y.

In other embodiments, the auxiliary shaft 233a may also extend along the second axis Y instead and the two bevel gears 233b of the bevel gear module may be disposed between the auxiliary shaft 233a and the first screw 231, so that the rotation of the auxiliary shaft 233a along the second axis Y can be translated into the rotation of the first screw 231 along the first axis X to drive the second base 20b to move along the first axis X. This may also facilitate the user in performing the two-dimensional position adjustment on the same side.

Figure 3:
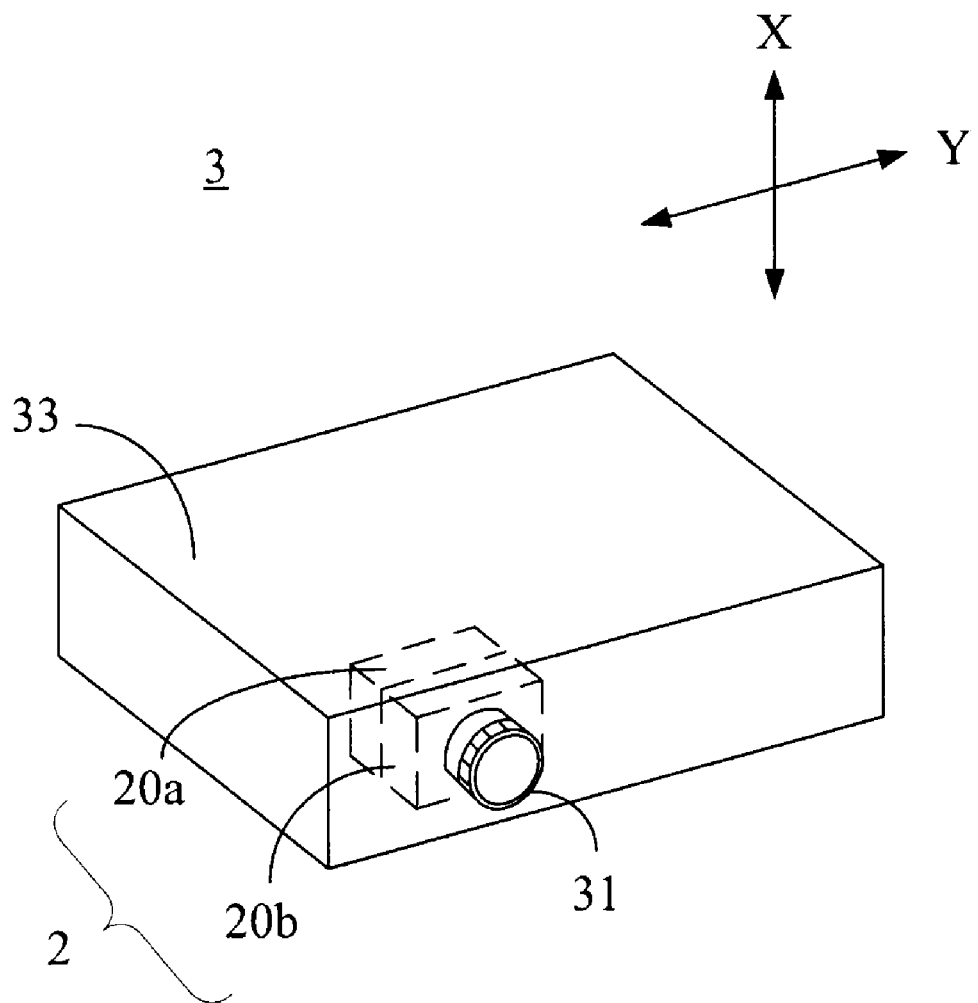
FIG. 3 is a schematic view of a projection apparatus of this invention.

As shown in FIG. 3, another embodiment of this invention is a projection apparatus 3. The projection apparatus 3 comprises the aforesaid two-dimensional adjusting structure 2 and a lens module 31. Herein, only necessary elements are illustrated in FIG. 3, and the two-dimensional adjusting structure 2 located inside the projection apparatus 3 is only simply delineated by dashed lines. For the detailed structure of the two-dimensional adjusting structure 2, reference may be made to FIGS. 2A through 2E. In the projection apparatus 3, the two-dimensional adjusting structure 2 is fixed by the first base 20a to the body 33 of the projection apparatus 3. The second base 20b of the two-dimensional adjusting structure 2 further comprises a lens mount 27 as shown in FIGS. 2A through 2C to fix the lens module 31. Thereby, the lens module 31 is adapted to be moved and positioned along the first axis X and the second axis Y respectively with respect to the body 33 of the projection apparatus 3 by means of a single position adjusting platform assembly (i.e., the two-dimensional adjusting structure 2 of this invention), to adjust the projection position of images projected.

Figure 1:
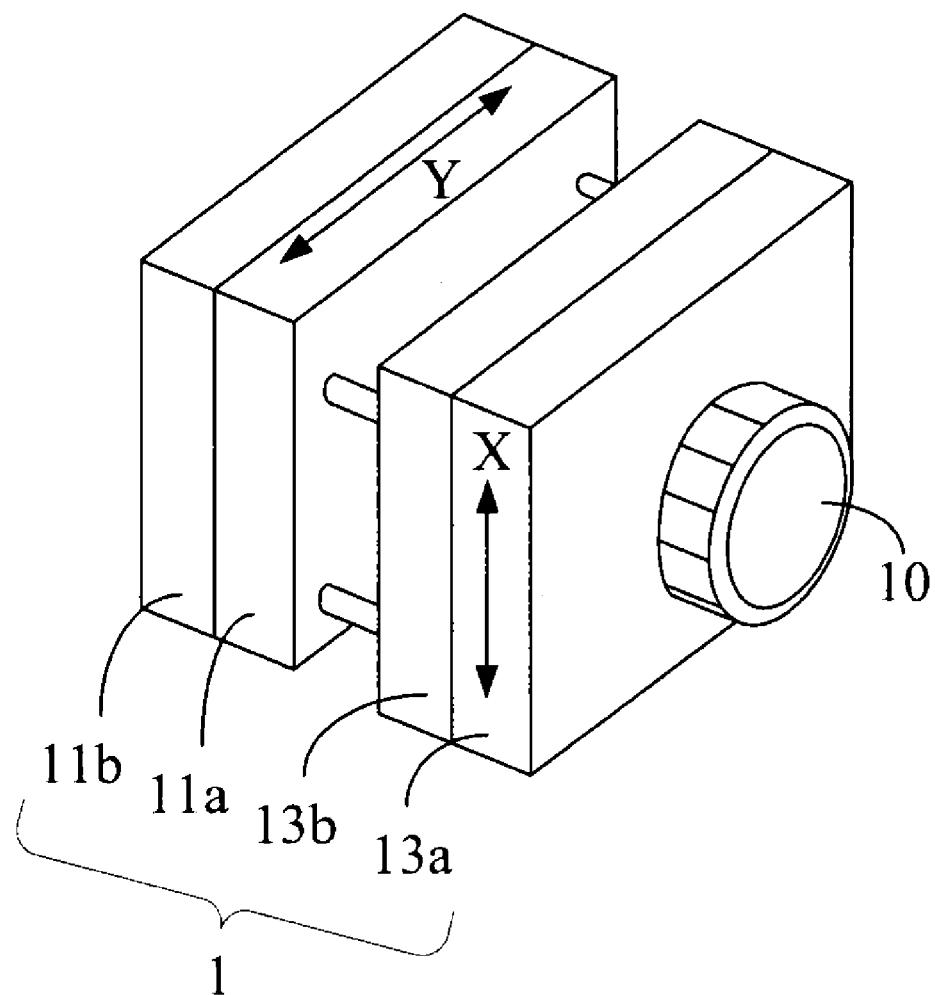
FIG. 1 is a schematic view of the conventional two-dimensional adjusting structure.

The projection apparatus 3 of this invention overcomes the problem of the conventional projection apparatus, in which two position adjusting platform assemblies shown in FIG. 1 (i.e., a combination of the bases 11a, 11b and a combination of the bases 13a, 13b) are needed to accomplish the purpose of two-dimensional adjustment, movement and positioning. Accordingly, the projection apparatus 3 is decreased in volume remarkably as compared to the conventional projection apparatus. Additionally, although FIG. 3 shows that the first axis X is the vertical direction while the second axis Y is the horizontal direction, the whole two-dimensional adjusting structure 2 may be rotated in other embodiments to turn the first axis X into the horizontal direction and the second axis Y into the vertical direction.

The two-dimensional adjusting structure 2 of this invention may further be joined with another adjusting mechanism (not shown) to adjust the position of the first object (e.g., the lens module 31) along a third axis. The third axis may be perpendicular to the first axis X and the second axis Y so that the position of the first object (e.g., the lens module 31) can be adjusted in three dimensions.

In the above embodiments, the two-dimensional adjusting structure 2 is operated by manually rotating the first screw 231 and the second screw 233 respectively so that the second base 20b can move along the first axis X and the second axis Y with respect to the first base 20a. However, the two-dimensional adjusting structure 2 may further be connected with various actuators (e.g., an electric motor) that are electrically driven to perform quicker and more accurate adjustment.

According to the above descriptions, by replacing the conventional adjusting structure with a two-dimensional adjusting structure of a smaller volume, this invention is adapted to perform two-dimensional movement and positioning within a narrow space, thereby adjusting the two-dimensional relative positions of the two objects disposed on the first base and the second base respectively. Moreover, the two-dimensional adjusting structure of this invention has a greatly decreased weight. In practical applications, apart from being employed in various projection apparatuses (especially small portable projection apparatuses), the two-dimensional adjusting structure of this invention may further be employed widely in other apparatuses that require the adjustment of two-dimensional relative positions of two objects.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A two-dimensional adjusting structure for adjusting the relative position of a first object with respect to a second object, the two-dimensional adjusting structure comprising:
   a first base fixed to the second object;
   a first sliding rod extending along a first axis and fixed to the first base;
   a second sliding rod extending along a second axis and comprising a first sliding hole, wherein the first sliding rod is received in the first sliding hole to mate with the second sliding rod, so that the second sliding rod is adapted to move along the first axis with respect to the first sliding rod; and
   a second base, for the disposition of the first object, comprising a second sliding hole, wherein the second sliding rod is received in the second sliding hole, so that the second base is adapted to move along the second axis with respect to the second sliding rod;
   wherein, by the use of the second sliding rod, the second base is capable of moving along the first axis and the second axis independently with respect to the first base upon a plane.

2. The two-dimensional adjusting structure as claimed in claim 1, wherein the second base further comprises a first slot extending along the second axis for correspondingly receiving the first sliding rod, and the first slot is adapted to move with respect to the first sliding rod along the second axis while the second base moves along the second axis.

3. The two-dimensional adjusting structure as claimed in claim 1, wherein the two-dimensional adjusting structure comprises two first sliding rods and four second sliding rods and the second base comprises four second sliding holes, each of the first sliding rods is fixed to the first base, two of the second sliding rods mates with one of the first sliding rods correspondingly by the use of the first sliding holes thereof and the second sliding rods are received within the second sliding holes respectively.

4. The two-dimensional adjusting structure as claimed in claim 1, wherein the two-dimensional adjusting structure further comprises a first screw disposed on the first base along the first axis and the second base comprises a first threaded hole, and the first screw is adapted to drive the second base to move along the first axis by the use of the first threaded hole while the first screw rotates along the first axis.

5. The two-dimensional adjusting structure as claimed in claim 4, wherein the second base further comprises a first sliding block having the first threaded hole, and the first sliding block moves along the first axis while the first screw rotates along the first axis with respect to the first sliding block.

6. The two-dimensional adjusting structure as claimed in claim 5, wherein the second base further comprises a first sliding groove and a second slot both extending along the second axis, the first sliding groove is adapted to receive the first sliding block, the second slot is adapted to correspondingly receive the first screw, and the first sliding groove moves along the second axis with respect to the first sliding block and the second slot moves along the second axis with respect to the first screw while the second base moves along the second axis.

7. The two-dimensional adjusting structure as claimed in claim 1, wherein the two-dimensional adjusting structure further comprises a second screw disposed on the first base along the second axis, the second base comprising a second threaded hole, and the second screw is adapted to drive the second base to move along the second axis by the use of the second threaded hole while the second screw rotates along the second axis.

8. The two-dimensional adjusting structure as claimed in claim 7, wherein the second base further comprises a second sliding block having the second threaded hole, and the second sliding block is adapted to move along the second axis while the second screw rotates.

9. The two-dimensional adjusting structure as claimed in claim 8, wherein the second base further comprises a second sliding groove and a third slot both extending along the first axis, the second sliding groove is adapted to receive the second sliding block and the third slot is adapted to receive the second screw, and the second sliding groove moves along the first axis with respect to the second sliding block and the third slot moves with respect to the second screw along the first axis while the second base moves along the first axis.

10. The two-dimensional adjusting structure as claimed in claim 7, wherein the two-dimensional adjusting structure further comprises a bevel gear module and an auxiliary shaft extending along the first axis, the bevel gear module is disposed between the auxiliary shaft and the second screw, and, by the use of the bevel gear module, the second screw rotates along the second axis while the auxiliary shaft rotates along the first axis.

11. The two-dimensional adjusting structure as claimed in claim 1, wherein the first axis is perpendicular to the second axis.

12. The two-dimensional adjusting structure as claimed in claim 1, wherein the first object is a lens module and the second base comprises a lens mount for the lens module.

13. A projection apparatus, comprising:
    the two-dimensional adjusting structure as claimed in claim 1, in which the second base further comprises a lens mount; and
    a lens module mounted on the lens mount;
    wherein the lens module is capable of moving along the first axis and the second axis independently with respect to the first base.

14. A two-dimensional adjusting structure for a second base moving with respect to a first base upon a plane, the two-dimensional adjusting structure comprising:
    a first sliding rod fixed to the first base;
    a second sliding rod comprising a first sliding hole, wherein the first sliding rod is received in the first sliding hole to mate with the second sliding rod, so that the second sliding rod is adapted to move along a first axis with respect to the first sliding rod; and
    a constraining component fixed to the second base, wherein the first sliding rod and the second sliding rod are received in the constraining component, and the constraining component comprises a predetermined space for the first sliding rod partially moving along a second axis with respect to the constraining component.

15. The two-dimensional adjusting structure as claimed in claim 14, wherein the predetermined space of the constraining component comprises a first slot, so that the first sliding rod is adapted to penetrate therethrough and the constraining component is adapted to partially move along the second axis with respect to the first sliding rod.

16. The two-dimensional adjusting structure as claimed in claim 15, wherein the predetermined space of the constraining component further comprises a second sliding hole connected with the first slot, so that the second sliding rod is adapted to be disposed therein and the second sliding rod is adapted to move along the second axis in the second sliding hole.

17. The two-dimensional adjusting structure as claimed in claim 16, wherein the two-dimensional adjusting structure further comprises a first screw and a second screw both disposed on the first base, the first screw is adapted to drive the second base to move along the first axis while the first screw rotates, and the second screw is adapted to drive the second base to move along the second axis while the second screw rotates.

* * * * *